(12) United States Patent
Strumpf

(10) Patent No.: US 8,923,339 B2
(45) Date of Patent: Dec. 30, 2014

(54) SYSTEMS AND METHODS OF DATA TRANSMISSION AND MANAGEMENT

(75) Inventor: David M. Strumpf, San Diego, CA (US)

(73) Assignee: PCN Technology, Inc., San Diego, CA (US)

( * ) Notice: Subject to any disclaimer, the term of this patent is extended or adjusted under 35 U.S.C. 154(b) by 0 days.

(21) Appl. No.: 13/413,026

(22) Filed: Mar. 6, 2012

(65) Prior Publication Data

US 2012/0226920 A1 Sep. 6, 2012

Related U.S. Application Data

(60) Provisional application No. 61/449,688, filed on Mar. 6, 2011.

(51) Int. Cl.
| | |
|---|---|
| H04J 1/00 | (2006.01) |
| G06F 11/14 | (2006.01) |
| H04L 25/14 | (2006.01) |
| G08C 15/02 | (2006.01) |
| H02J 3/00 | (2006.01) |
| H04B 3/54 | (2006.01) |
| G06F 11/26 | (2006.01) |
| G06F 11/30 | (2006.01) |
| H04L 5/08 | (2006.01) |
| H04L 27/26 | (2006.01) |
| H04L 5/06 | (2006.01) |
| H04J 1/08 | (2006.01) |
| H04L 25/03 | (2006.01) |

(52) U.S. Cl.
CPC ............ *G06F 11/1443* (2013.01); *H04L 25/14* (2013.01); *G08C 15/02* (2013.01); *H02J 3/00* (2013.01); *H04B 3/54* (2013.01); *G06F 11/26* (2013.01); *G06F 11/3006* (2013.01); *H04L 5/08* (2013.01); *H04L 27/2666* (2013.01); *H04L 5/06* (2013.01); *H04J 1/08* (2013.01); *H04L 2025/0342* (2013.01); *Y04S 40/24* (2013.01)
USPC ........... 370/480; 370/487; 370/493; 370/494; 370/495

(58) Field of Classification Search
None
See application file for complete search history.

(56) References Cited

U.S. PATENT DOCUMENTS

| | | | |
|---|---|---|---|
| 5,485,040 | A | 1/1996 | Sutterlin |
| 5,929,750 | A | 7/1999 | Brown |

(Continued)

OTHER PUBLICATIONS

Office Action issued Jul. 25, 2014 in related Taiwanese Patent Application No. 101107545.

(Continued)

*Primary Examiner* — Faruk Hamza
*Assistant Examiner* — Andrew Oh
(74) *Attorney, Agent, or Firm* — Eric L. Lane; Green Patent Law

(57) ABSTRACT

Data communications systems and methods comprise a conductive media infrastructure in communication with a baseband data universe propagating at least one first signal and a broadband data universe propagating at least one second signal. At least one segmentation device is in communication with the conductive media infrastructure and partitions the broadband data universe from the baseband data universe. A coupling device is in communication with the at least one segmentation device and modulates transmission parameters of the second signal such that information travels within the broadband data universe via the conductive media infrastructure and avoids the baseband data universe. Power distribution and management systems and methods are also provided which preserve power distribution via a baseband data universe while one or more devices communicate energy data via a broadband data universe.

11 Claims, 7 Drawing Sheets

(56) References Cited

U.S. PATENT DOCUMENTS

| | | | |
|---|---|---|---|
| 6,014,386 | A | 1/2000 | Abraham |
| 6,069,899 | A * | 5/2000 | Foley .......................... 370/494 |
| 6,313,738 | B1 | 11/2001 | Wynn |
| 6,396,392 | B1 | 5/2002 | Abraham |
| 6,441,723 | B1 | 8/2002 | Mansfield, Jr. et al. |
| 6,481,013 | B1 * | 11/2002 | Dinwiddie et al. ............ 725/80 |
| 6,515,485 | B1 | 2/2003 | Bullock et al. |
| 6,522,626 | B1 | 2/2003 | Greenwood |
| 6,590,493 | B1 | 7/2003 | Rasimas et al. |
| 6,631,350 | B1 * | 10/2003 | Celi et al. ...................... 704/270 |
| 6,674,843 | B1 | 1/2004 | Ham |
| 6,744,883 | B1 | 6/2004 | Bingel et al. |
| 6,747,859 | B2 | 6/2004 | Walbeck et al. |
| 7,064,654 | B2 | 6/2006 | Berkman et al. |
| 7,098,773 | B2 | 8/2006 | Berkman |
| 7,102,478 | B2 | 9/2006 | Pridmore, Jr. et al. |
| 7,167,081 | B2 | 1/2007 | Strumpf et al. |
| 7,250,874 | B2 | 7/2007 | Mueller et al. |
| 7,289,887 | B2 | 10/2007 | Rodgers |
| 2002/0031116 | A1 * | 3/2002 | Czerwiec et al. ............. 370/352 |
| 2003/0062990 | A1 | 4/2003 | Schaeffer, Jr. et al. |
| 2003/0103307 | A1 | 6/2003 | Dostert |
| 2003/0232599 | A1 | 12/2003 | Dostert et al. |
| 2004/0001438 | A1 | 1/2004 | Aretz et al. |
| 2006/0200542 | A1 | 9/2006 | Willig |
| 2007/0174644 | A1 | 7/2007 | Willig |
| 2007/0229231 | A1 | 10/2007 | Hurwitz et al. |
| 2009/0170445 | A1 | 7/2009 | Wang et al. |
| 2009/0304101 | A1 * | 12/2009 | LoPorto et al. ............... 375/260 |
| 2010/0002755 | A1 * | 1/2010 | Heidari et al. ................ 375/222 |
| 2010/0021176 | A1 * | 1/2010 | Holcombe et al. ........... 398/115 |
| 2011/0069672 | A1 * | 3/2011 | Lee et al. ...................... 370/330 |
| 2011/0268225 | A1 * | 11/2011 | Cronie et al. ................. 375/296 |
| 2013/0142177 | A1 * | 6/2013 | Nentwig ....................... 370/336 |

OTHER PUBLICATIONS

Office Action dated Jun. 3, 2014 from the Canadian Intellectual Property Office in corresponding Canadian Patent Application No. 2,770,166.

Office Action dated Apr. 14, 2014 from Canadian Intellectual Property Office in corresponding Canadian Patent Application No. 2,770,166.

International Preliminary Report on Patentability and Written Opinion of the International Searching Authority from corresponding International Patent Application No. PCT/US2012/027850.

* cited by examiner

SYSTEMS AND METHODS OF DATA TRANSMISSION AND MANAGEMENT

CROSS-REFERENCE TO RELATED APPLICATION

This application is a non-provisional of and claims priority to U.S. Patent Application Ser. No. 61/449,688, filed Mar. 6, 2011, which is hereby incorporated by reference in its entirety.

FIELD

The present disclosure relates to data communication systems and methods.

BACKGROUND

A significant infrastructure of sensor and control networks operates through distributed intelligence and communication systems. Over the last 25+ years the industrial and commercial industries for sensory and control automation have used methods of multiplexing digital signals to minimize the number of wires installed in a control network. More particularly, the industry of data communication networking has evolved from a point to point RS-232 single server/many terminal (client) topology into a cloud-based interconnection of devices that strive to become a ubiquitous "web of devices."

Today we think of this ubiquity as the Internet. However, there are actually thousands of sub-networks below the Internet and in parallel with the Internet that contain independent communication systems related to human interface as well as machine interface. Many of these machine-to-machine (M2M)/non-Internet networks are closed systems that do not have a seamless method of connecting to an outside network.

One of the primary existing interfaces for closed-system networks is RS-485 (EIA-485), which is a differential voltage communication interface that has become extremely popular for M2M interface applications over the last 25+ years and uses UTP (unshielded twisted pair) wires in order to provide low to medium speed signaling to many nodes of an embedded network. This is typically accomplished by having a single master node communicating with several slave nodes on a single pair of wire (two conductors) that "multi-drop" between the master and the multiple slaves. This type of communication is generally referred to as serial communication and specifically half-duplex (two wire) RS-485 networking. One example of this method would be modbus serial protocol/communication.

RS-485 can be found today on most real-world industrial and commercial equipment that operates in a distributed communication mode of functionality. This means that the overall RS-485 system operation gains its effectiveness and flexibility of operation by allowing the system to be configured and connected with many possible connections of devices to sense, monitor and control the sub-systems of an overall closed-system through the communication protocol(s) and communication interface(s) that the system designer envisioned.

One of the down sides of a closed system is that it is not designed to allow seamless integration to an open-system philosophy, which is increasingly desired and demanded by industry markets today (e.g., devices connecting to the Internet, outside networks, or mobile devices). As these industries evolved over the last two decades, many additional wish-list items have been added to the needs of industrial and commercial embedded networking. Many of the solutions over the last decade have migrated toward Internet accessibility as a general goal within the marketplace.

One of the current methods that many industries are migrating toward today is IP enabling their devices so that the advantages of ubiquity over the Internet can be exploited by currently manufactured closed-systems or legacy installations of closed systems. Internet Protocol (IP) enabling is the concept of allowing a device (machine, human interface device, etc.) to network/interact with other IP enabled devices in a relationship of server/client, peer-to-peer or other conceptual system interconnections.

The idea of IP connectivity is that every closed-system, sub-network, or device (based on the application or desired functionality) is assigned an IP Address that gives the connection point a unique method of identification. Examples of connections to devices are TCP/IP, UDP and many other OSI 7 layer network model standards driven concepts. The overall intent is that any IP-enabled device could, in theory, communicate to and from any other IP enabled device provided there is sufficient communication intelligence local to the device and the method of identifying each device.

Internet accessibility has most commonly been accomplished by using Ethernet as an information technology (IT) solution for networking multiple nodes using CAT5 cabling. The use of Ethernet for networking consists of the use of TCP/IP for Internet Protocol access which allows remote access as well as Local Area Network (LAN) functionality. Internet and other outside access can be implemented by adding an IP-enabled Ethernet jack (802.3 RJ-45), a WiFi (802.11) wireless, or other interfaces such as Bluetooth, Zigbee, LIN, CAN, etc.

However, this migration of installations using both RS-485 with UTP cabling and CAT5 for Ethernet has caused a disconnect between the goals and installation methods of the two different network methodologies. Ethernet networking over CAT5 cabling is an evolution from office computing and IT professionals. This often means that specialized network professionals are needed on-site during installation to install, configure and verify the proper operation and connections of the Ethernet network.

RS-485 systems are often successfully implemented by trained electricians (not network specialists) and the cabling is much simpler and minimized due to the multi-drop methods of connecting the UTP cable. There is a general trend today toward both the local control benefits of RS-485 as well as expansion of the capabilities (and global access) of Ethernet and TCP/IP communication within industrial and commercial networks. In addition, supervisory control and data acquisition (SCADA) systems are abundantly deployed in the industrial and commercial markets. Many of these SCADA systems today are being forced or persuaded by the market to transition to Ethernet interfaces.

Many devices have been created today that attempt to combine the use of RS-485 (or serial data networks) along with TCP/IP (Ethernet IP networks). These devices utilize a technique of serial data tunneling that converts the image of serial data packets into Ethernet frames and transports the serial data as packets via TCP/IP or UDP data over the Ethernet CAT5 cabling. This solution attempts to eliminate UTP RS-485 cabling and migrates toward solely using CAT5 cables.

In addition, most closed systems that communicate between addressed devices or nodes within the closed system utilize a simplified addressing method that is very similar to IP addressing but is typically limited to a much smaller number of nodes on the closed-system network. Typical networks can be found with maximum nodes of four, eight, sixteen, or thirty-two nodes (based on the original RS-485 specification). There are also RS-485 network evolution types that support up to 256 nodes per twisted-pair bus.

Many manufacturers have recognized the desire to interconnect and expand closed systems and market them as Internet accessible by utilizing converters and gateways. A common gateway application is the allow RS-485 closed-systems to gain ubiquitous access to an IP-Enabled Internet Access. A common use of this gateway application is to create web-page access through the Internet to monitor and edit parameters on the closed system. The gateway is often seen by the closed system as a slave node or more directly becomes the master node of the closed system.

Because closed systems were originally designed to be secure, reliable and consistently functional as guaranteed-by-design due to the nature of being closed to the outside world, once system designers move away from this core belief the overall system design begins to fragment in its cohesion of reliability and predictability of operation. As the desire to become flexible, scalable and ubiquitous grows, the M2M industries are becoming more aware of the complexities of reliability of operation, security of data, scalability of their solutions, and legacy support of their core competency strengths within their industry. The nature of data protocol conversion and transport through IP-enabled systems is often a tradeoff between gaining flexibility and Internet access and decreasing reliability, security and forced system redesign.

One of the characteristics of RS-485 to IP-enabled transport is the latency (or delayed delivery of bytes/packets) due to the dissecting, reformatting and non-native transport of the data payloads within the IP (typically Ethernet frames of data). The problems are at multiple levels. First, the natural latency of delayed delivery of packets can cause unstable or undesirable operation because the original closed-system design expects the network to perform in a deterministic manner with consistent network timings. Second, many RS-485 data protocols utilize time-based packet delimiting as a mechanism for separating and identifying the information on the native RS-485 serial network. This is a serious problem when attempting to incorporate data converters that transport IP-enabled Ethernet frames. The RS-485 serial network is operating on a cadence or heartbeat of synchronized activity of bits, bytes and packet frames. An example of this protocol usage is modbus serial RTU and is widely used in industrial and commercial M2M networks.

Thus, one of the key problems that arises with this technique is that data latency (bit to bit, byte to byte and frame continuity) is rarely maintained and cannot maintain delivery within specification of the network requirements. Many systems would benefit from maintaining the low-latency management of UTP while evolving to Ethernet TCP/IP (without the use of data tunneling or serial data converters).

Related problems arise in the powerline communication or current-carrier communication systems used in smart grid applications. More particularly, there are reliability issues due to localized noise from back splatter or inductive kickback because of switching power supplies, motors, ballasts, etc. In addition, there are problems of unstable noise-floor energy throughout power infrastructure and varying attenuation causing dynamic signal-to-noise ratios because of unknown distances between nodes throughout the power system's infrastructure. The noise-filtering techniques used today for delivering power and energy data filter high frequencies by bypassing the high frequencies across the powerlines or shunting the unwanted signals through filtering devices.

However, this shorting out of the unwanted frequencies on the power wires in an effort to leave only the clean, low-frequency component of the power waveform causes a bypass or shunt of the unwanted frequencies within the power wire's frequency spectrum. That is problematic when the higher frequencies of the power infrastructure need to be used for additional purposes other than powering the devices, such as energy data communication and management. As described herein, exemplary embodiments solve these problems by enabling power distribution over a baseband data universe to devices needing electricity while also facilitating transmission of power or energy data over one or more broadband data universes. This is important because efficient distribution of power, management of energy usage and demand response capability has become very important in view of the growing population and the intensifying problem of global warming.

Accordingly, there is a need for contiguous packet delivery and low-latency delivery of byte frames (often with very few bytes i.e. <32) when processing real-time and/or closed-loop sensory and control systems. There is also a need for efficient distribution of power over a baseband to devices needing electricity while also facilitating transmission of power or energy data over one or more broadband channels for management of energy usage and demand response capability. More generally, there is a need for a system that maintains low-latency management of UTP when combined with Ethernet TCP/IP networks.

SUMMARY

Embodiments of the present disclosure alleviate to a great extent the disadvantages of known communications systems by providing systems and methods of transporting RS-485 serial data in its native protocol format while additionally providing IP-enabled Ethernet traffic to a true multi-drop/single twisted cable. More particularly, in disclosed embodiments segmentation devices such as filters partition a broadband data universe from a baseband data universe, and a coupling device modulates transmission parameters such that information travels within the broadband data universe and avoids the baseband data universe.

Disclosed embodiments provide the ability to repurpose the typical network cabling that is utilized in most RS-485 serial systems to allow the continued functionality of the RS-485 closed system while additionally IP-enabling the local nodes' capabilities with access to a new Ethernet access path over the same wired infrastructure. It should be noted that embodiments of the present disclosure allow implementations in data communication networks that utilize Ethernet and RS-485 communication, but embodiments are not limited to these two network types.

In general terms, multiple blocks of modulation, demodulation, analog filters, digital filters and data framing and steering logic are used to allow the segmentation of a low-frequency bus (LF bus) as a baseband of RS-485 UTP networking of serial data. While additionally a broadband bus (BB bus) is carrying multiplexed network data over the UTP (twisted pair wires). Disclosed embodiments provide Ethernet TCP/IP communication multiplexed with RS-485 or serial data network traffic/packets with minimal and deterministic latency and maintaining packet framing integrity.

Exemplary embodiments of a data communication system comprise a conductive media infrastructure in communication with a baseband data universe propagating at least one first signal and a broadband data universe propagating at least one second signal. At least one segmentation device is in communication with the conductive media infrastructure and partitions the broadband data universe from the baseband data universe. A coupling device is in communication with the at least one segmentation device and modulates transmission parameters of the second signal such that information travels within the broadband data universe via the conductive media infrastructure and avoids the baseband data universe. The transmission parameters may comprise one or more of wave shapes and wave frequencies.

In exemplary embodiments, the baseband data universe resides within a differential communications system used to communicate serial data on an existing unified communication system. The baseband data universe may reside on conductive media comprising at least one twisted pair of wire. The system may further comprise a plurality of broadband data universes. The first signal may be independently occurring in the baseband data universe. The broadband data universe may contain encoded information structured as digital network data packets. In exemplary embodiments, the first signal is generated directly onto the conductive media, and the system further comprises an LF-bus in communication with the at least one first signal of the baseband data universe. The conductive media infrastructure may comprise a differential communication wireline bus and may further comprise a filtering device in communication with the differential communication wireline bus, the filtering device canceling common mode noise in the baseband data universe.

Exemplary embodiments include computer-implemented methods of transporting multiple data protocols using a conductive media infrastructure, comprising providing a baseband data universe propagating at least one first signal, providing at least one broadband data universe propagating at least one second signal, partitioning the broadband data universe from the baseband data universe, and modulating transmission parameters of the second signal. The partitioning step is performed such that the broadband data universe and the baseband data universe are segmented. The transmission parameters of the second signal are modulated such that information travels within the broadband data universe via the conductive media infrastructure and avoids the baseband data universe.

The transmission parameters may comprise one or more of wave shapes and wave frequencies. In exemplary embodiments, the baseband data universe resides within a differential communications system used to communicate serial data on an existing unified communication system. The first signal may be independently occurring in the baseband data universe. The broadband data universe may contain encoded information structured as digital network data packets. Exemplary methods further comprise providing conductive media comprising at least one twisted pair of wire wherein the baseband data universe resides on the conductive media. Methods may also comprise providing a plurality of broadband data universes. Exemplary methods may include the step of transporting and reconstructing a baseband wave shape retaining true analog integrity of a baseband wave shape. Exemplary methods may comprise directly generating the first signal in the baseband data universe and providing an LF-Bus in communication with the at least one first signal of the baseband data universe. In exemplary methods, the conductive media infrastructure comprises a differential communication wireline bus and such methods further comprise canceling common mode noise in the baseband data universe.

Exemplary embodiments include a power distribution and management system comprising a conductive media infrastructure in communication with a baseband data universe distributing power and at least one broadband data universe communicating energy data. A power distribution tap is in communication with the conductive media infrastructure, and the power distribution tap partitions the broadband data universe from the baseband data universe. A dual power communication tap delivers the baseband data universe and the at least one broadband data universe bi-directionally via the conductive media infrastructure such that the power distribution via the baseband data universe is preserved while one or more devices communicate the energy data via the broadband data universe. Such embodiments provide improved energy management and energy load response capability.

Accordingly, it is seen that systems and methods of data communication and computer-implemented methods of transporting multiple data protocols using a conductive media infrastructure are disclosed. The disclosed systems and methods provide the capability to transport multiple protocols, topology design, and interface types over existing baseband such as twisted wire pairs while additionally providing IP-enabled Ethernet traffic to a true multi-drop/single twisted cable. These and other features and advantages will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which.

DETAILED DESCRIPTION

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure.

As used herein, the "present disclosure" refers to any one of the embodiments described herein, and any equivalents. Furthermore, reference to various aspects of the disclosure throughout this document does not mean that all claimed embodiments or methods must include the referenced aspects.

Figure 1:
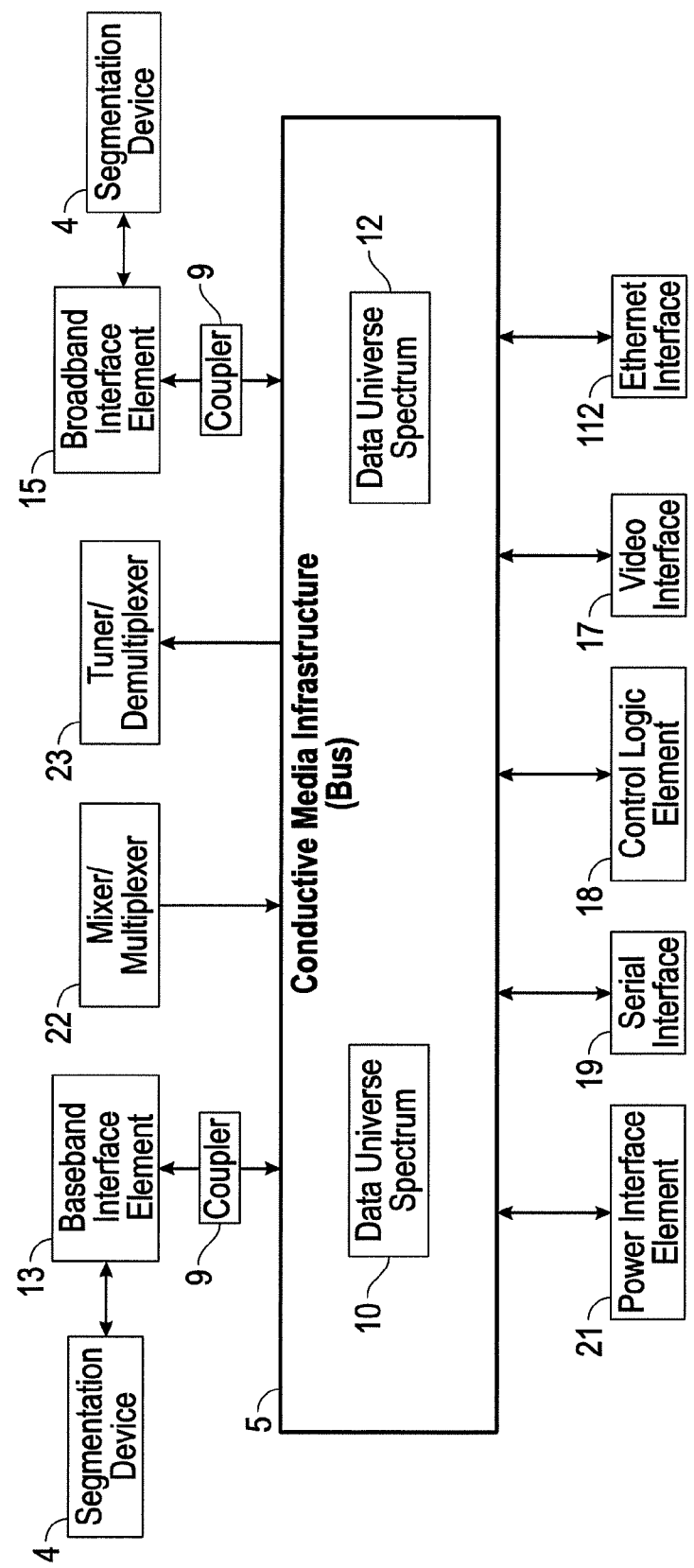
FIG. 1 is a block diagram showing exemplary network architecture used in embodiments of a communications system in accordance with the present disclosure.

FIG. 1 is a block diagram of communications network architecture for implementing exemplary systems and methods of the present disclosure. The network may include conductive media infrastructure 5 such as a bus in communication with a number of other network devices. One or more data universe spectrums 10, 12 are in communication with the bus 5. A baseband interface element 13 and a broadband interface element 15 communicate with the bus 5, which also includes connections with segmentation devices 4, such as filters, and couplers 9. A mixer/multiplexer 22 and tuner/demultiplexer 23 also may be provided. Also shown in FIG. 1 are a serial interface 19, such as RS-485, a video interface 17, and an Ethernet interface 112. Finally, a power interface element 21 and a control logic element 18, such as a state machine or other device akin to a CPU, may be provided in communication with the bus 5. It should be noted that disclosed embodiments can be implemented via software, hardware, or different combinations of the two.

Exemplary embodiments relate to communications over a conductive media infrastructure 5, 105, 205, which may comprise any material or medium (liquid, solid or gas) capable of conducting electricity or a signal of intelligence that can be propagated onto a transfer medium. Such conductive media include, but are not limited to, wire (including, but not limited to, a single wire, a twisted pair of wire and/or untwisted pair of wire, or any other configuration of wire), metal, water, fluids, light, e.g., laser through media such as fiber optic cable.

Figure 2:
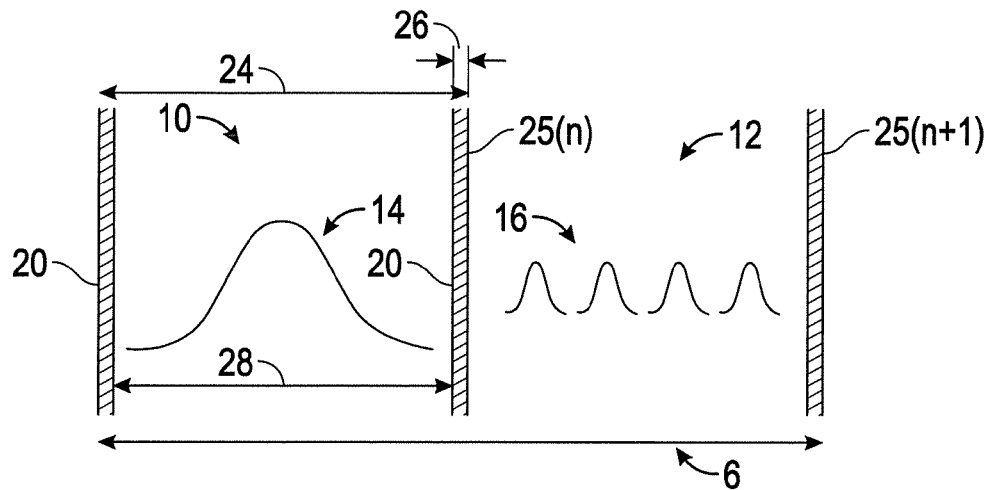
FIG. 2 is a schematic diagram of an exemplary embodiment of a communications system in accordance with the present disclosure.

Embodiments of the present disclosure utilize a concept of multiple data universes, or multi-universe spectrum allocation, an exemplary embodiment of which is illustrated in FIG. 2. The term data universe is used herein to mean any container element (or envelope) in a frequency domain that contains encoded energy patterns representing signal intelligence. Data universes may be aligned in an ordered array of non-overlapping container elements in the frequency domain that combine in such a way as to contain all of the encoded energy patterns throughout the multiple data universes present on the conductive media. An array of data universes does not need to be contiguous and can be implemented with strategic or practical gaps in the frequency spectrum between data universes.

FIG. 2 shows a baseband data universe 10 partitioned from a broadband data universe 12 in the network frequency envelope 6. BB-bus 105 (shown, e.g., in FIGS. 3-4) contains frequency spectrum channels for universe data allocation in the frequency range(s) defined for each data universe. A BB-bus can be a broadband multiplexed com bus and is the conductive media infrastructure or transport mechanism used to manage and transmit information in embodiments described in the present disclosure. As described in more detail herein, information can be induced in the data universes.

Information within a data universe is used herein to mean an intentional structure of waveshape(s) in period and/or carrier shape that represents a transduced intelligence for the purpose of transporting and recreating a reproducible and recognizable representation of the original intelligence of a signal. The original transduced intelligence can be naturally occurring and/or modulated and encoded using one or more of a variety of waveshape managed techniques such as amplitude shift keying (ASK), frequency shift keying (FSK), phase shift keying (PSK), orthogonal frequency divisional multiplexing (OFDM) and pulse coded modulation (PCM) wave shaping and others. Information within a data universe may reside within the frequency constrained region defined as data universe signal width within a specific data universe. It is possible to combine multiple complex waveforms that allow multiple information types to reside within a specific data universe provided that the information is contained within the data universe signal width region of the specified data universe.

By modulating specific wave shapes 14 and frequencies 16, information in any form, e.g., intentional network packets, can be induced within the data universes such as broadband data universe 12 while "avoiding" or "preserving" the existing baseband data universe 10. This avoidance means that the broadband communications are not affected by the baseband communications and vice versa such that no data universe disrupts any other data universe. In exemplary embodiments, RS-485 serial data is implemented to function as the baseband data universe 10 (which may also be designated "n") while the Ethernet modulated signals are implemented to function as the broadband data universe 12 (which may also be designated "n+1").

Figure 8:
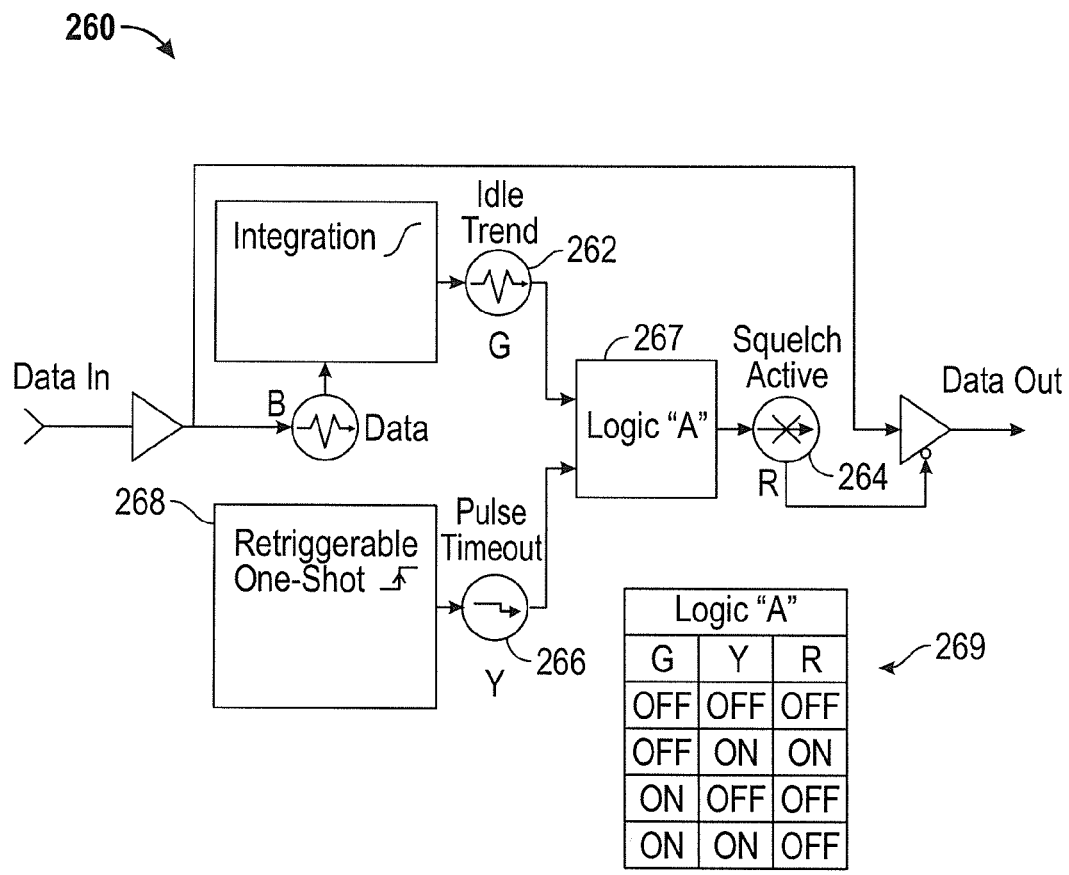
FIG. 8 is a process flow diagram of an exemplary embodiment of a squelch circuit in accordance with the present disclosure.
Figure 9:
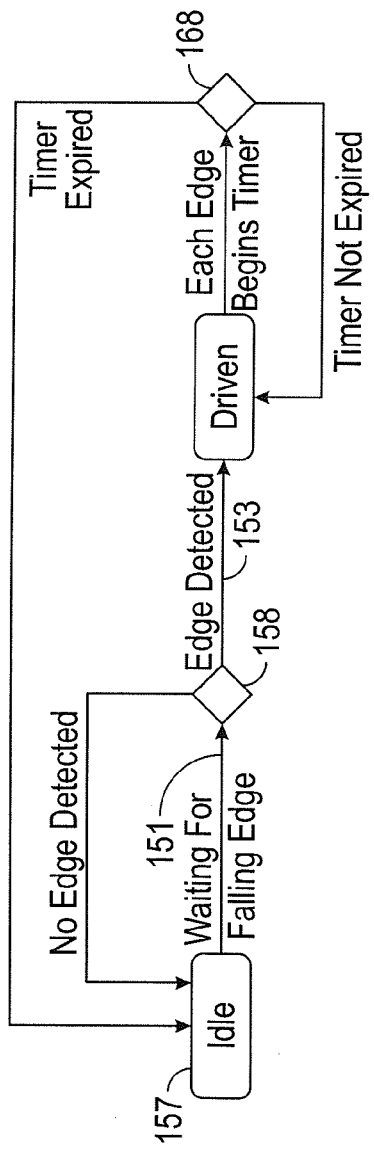
FIG. 9 is an exemplary time delay logic flow diagram in accordance with the present disclosure.
Figure 10:
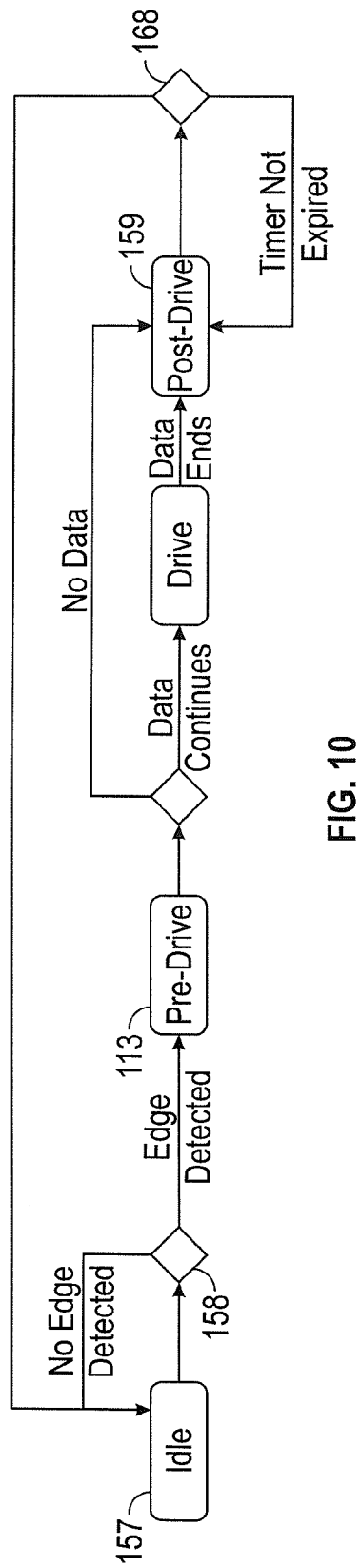
FIG. 10 is an exemplary finite state machine flow diagram in accordance with the present disclosure.

An exemplary method of preserving a naturally occurring waveform is to avoid inducing any additional signals onto the conductive media during a time period that could cause or is causing corruption to a data universe. One technique to avoid corruption of a local data universe (as well as avoiding corruption of other data universes) is to decrease amplitude or cease transmission for a period of time while observing the net effect of the action. As shown in FIG. 8, exemplary embodiments may use a squelch circuit 260 that monitors the local data universe and/or multiple data universes and determines the overall health of the data universe(s). If the squelch circuit determines that the health of the data universe is in a state of danger that may corrupt its data universe or other data universes, then the squelch circuit 260 will decrease amplitude for a period of time and reevaluate the health of the network. After a time period in which it determines that the amplitude can be increased, the squelch circuit 260 attempts to recover the amplitude to a fully functional state.

More particularly, the squelch circuit 260 may monitor the baseband data signal in both the LF to BB and BB to LF directions. Exemplary squelch circuits may monitor the current state (active or idle) of the data signals, integrate the signal to detect an idle trend 262, and monitor state changes to detect edges and provide a pulse timeout. Additionally, squelch circuit 260 may monitor the idle trend 262 and pulse and become squelch active 264 if the data does not trend idle and there is a pulse timeout 266 (indicating that the data line is held in the active state beyond the trend integration and pulse timeout time). Idle trend 262 and pulse timeout 266 are provided as inputs to Logic "A" 267, which in turn provides output 264 per the truth table 269.

One advantage of utilizing a squelch circuit is that the network 100 has an increased chance of retaining communication due to real-world failures and/or disruptions to service of a specific data universe's source signal. The use of a squelch circuit is particularly advantageous when an implementation contains many data universes and/or many connections onto the multidrop bus of conductive media.

The terminology indicates that there is one baseband while implementations could contain a plurality of broadband spectrum channels as (n−xx) [channels below the baseband] and/or (n+xx) [channels above the baseband]. An exemplary implementation contains only two data universes—one baseband (n) along with only one broadband (n+1) data universe.

However, embodiments are not limited to binary data networking. Embodiments may utilize multiple broadband data universes, and these higher frequency bands can be referenced as data universe (n+1), (n+2), (n+3), etc. Frequency bands that are lower than the baseband data universe 10 can be sub-band data universes referenced as data universe (n−1), (n−2), (n−3), etc. A significant benefit of disclosed embodiments is that two communications happen simultaneously on base band and broad band and any sub-channel. Implementations also could exist that utilize the delta signal integrity of multiple data universes to monitor and determine the quality-of-service (QoS) of a data network, the chemical composition of a solid, liquid or gas, or to assist in the transfer of signals through non-ideal interfaces such as power transformers.

Thus, embodiments include sub-band frequency wave-shape management methods which provide the ability to manage a specific data universe that can exist as a (n−1), (n), or (n+1) band position. Such methods allow implementation such as OFDM modulation to create single, multiple or many sub-channels of modulated frequencies and encoding methods within a specified data universe. The method of sub-band frequency wave-shaping can be different for any or all data universes that reside on a BB-bus conductive media infrastructure.

It is important to note that, in exemplary embodiments, each data universe is independently isolated within its logical existence from other data universes. This creates a virtual firewall of security and physical segmentation between data universes. No data universe is aware of any other data universe nor is any data universe capable of influencing or interfering with any other data universe. In an exemplary embodiment, the RS-485 baseband data universe is fully independent in operation and functionality to the modulated Ethernet broadband data universe and vice versa.

One of the specific benefits and unique characteristics of the baseband data universe (n) is the low-latency and contiguous frame cohesion attributes that are unique to the baseband perspective and functionality. The reason that data universe (n), or the existing baseband data universe 10, is referred to as "baseband" is that this universe is generally the "preservation perspective" or the signal that was previously utilized on the native/legacy design of the closed system. The advantage of utilizing the baseband for preservation is that the functions of the network will appear to the nodes on the legacy closed-system network as nearly identical to the original closed system's operation before implementation of disclosed embodiments. Thus, the baseband data universe 10 may be used to propagate the native signal of the existing legacy system. However, exemplary embodiments could also include methods of communicating over a differential communication wireline bus in the baseband while also carrying additional carriers on the same wireline bus in broadband. In such methods, the broadband carriers could contain independent intelligence from the baseband intelligence.

Referring to the exemplary embodiment of FIG. 2 in more detail, a segmentation process of frequencies occurs within a predefined or adapted set of defined partitions within an overall frequency spectrum. Each data universe 10, 12 may have a defined lower limit 20, upper limit 22, data universe overall width 24, and guard band width 26. The data universe overall width 24 is equal to (upper limit 22–lower limit 20). The data universe signal width 28 is equal to (upper limit 22–lower limit 20)–(guard band width 26×2). This accounts for the guard band width 26 being present and symmetrical at the lower limit 20 and upper limit 22 of each data universe 10, 12. The network frequency envelope 6 is equal to the highest of the upper limits of the data universes present on the BB-bus, in this case upper limit 22 (n+1), minus the lowest of the lower limits of data universes, in this example, lower limit 20.

As will be discussed in more detail herein, segmentation devices 104 such as filter blocks contain the modulation or signal intelligence, which may be present within the data universe signal width and is generally (but not always) centered within the data universe overall width 24 of the spectrum. As discussed in more detail herein, an important function of the filter blocks and coupling devices is to avoid having any signal intelligence or intentionally induced interference within the lower or upper guard bands.

Figure 3:
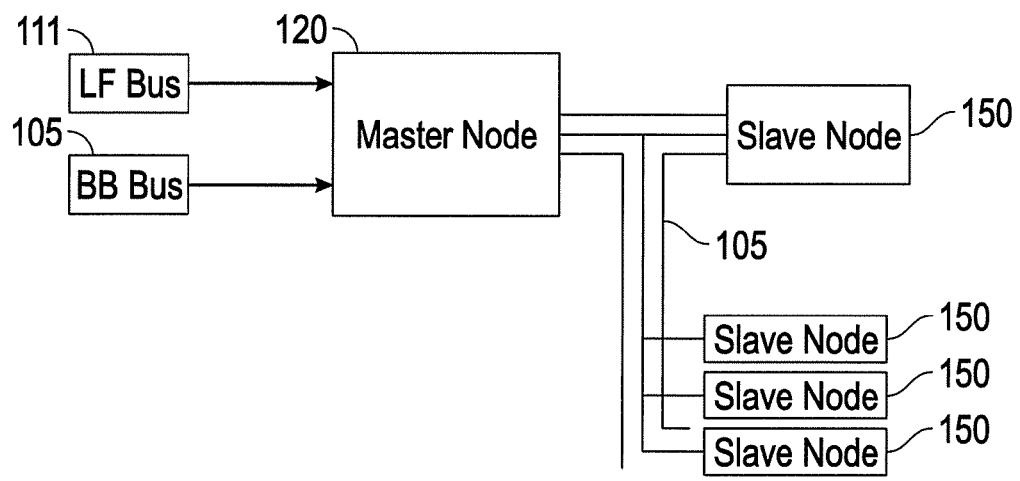
FIG. 3 is a process flow diagram of an exemplary embodiment of a communications system in accordance with the present disclosure.

Turning to FIG. 3, a basic flow diagram provides an overview of an exemplary communications network. LF bus 111 communicates the baseband signal and BB bus 105 communicates the broadband signal to the master node or server, which in turn, communicates the signals to any number of slave nodes or clients 150.

An exemplary implementation would construct multiple oscillators each at a specific frequency generating independent sine waves at their respective frequencies. With reference again to FIG. 2, there are five frequency domain elements, e.g., wave shape 14 and wave frequencies 16, shown that reside in two data universes 10, 12. The single frequency 14 can be enabled and disabled over time to provide an amplitude shift keying (ASK) method of modulation. In this example, data universe 10 frequency 14 would be functioning as data universe (n) or the baseband data universe. In exemplary embodiments, this waveform could already reside on a piece of wire and vary in amplitude over time and perhaps carry voice and/or sensor transduced analog information. It is also possible that the signal's wave shape 14 in the baseband data universe 10 could be strategically shaped as non-sinusoidal in order to encode binary data information using BPSK or QPSK encoding methods.

Meanwhile, in the broadband data universe (n+1) 12 shown in FIG. 2, the grouping of four distributed frequency components 16 may function as a group of information that can be managed as sub-channels and/or become a broader distribution of frequencies, which could be thought of as having a wider bandwidth within the broadband data universe. An example of this implementation could be four independent oscillators that are independently controlled by binary bits of data from a network serial data stream. In this particular example, the broadband data universe 12 could use ASK (or other modulation/encoding techniques) to represent four bits of data in real-time that are transported in unison synchronously within its respective data universe.

It should be noted that a specific data universe could be allocated to contain a wide bandwidth and therefore contain many sub-channels of modulated and encoded information. Exemplary embodiments may contain eight or more sub-channels and could be implemented to contain hundreds of sub-channels per data universe. The separation of baseband 10 and broadband data universes 12 allows different applications to manage varying bandwidths and non-uniform frequency bandwidth distribution throughout the conductive media infrastructure's frequency spectrum. In exemplary embodiments, the lower numbered (n−x, n) baseband data universes may be allocated lower frequencies (often less than 1 MHz) and travel over longer distances in the 1000s of feet. The higher (n+x) broadband data universes are generally more localized and tend to attenuate more rapidly over distance often due to capacitance of cabling and signal to noise ratios (SNR) becoming lower due to a higher noise floor based on the wavelength of the overall conductive media infrastructure. One of the benefits of utilizing sub-channels within a specific data universe is to provide redundant data paths for strategic noise avoidance when the SNR is low within a specific frequency region. Careful implementation of baseband and broadband data universes over specified frequency spectrum allocation can yield extremely high quality-of-service (QoS) as a data transport system.

An exemplary communications system and its components will be described in more detail with reference to FIGS. 4 and 5, which illustrate an exemplary multiplexed communications system wherein the conductive media infrastructure includes an Ethernet subcarrier multidrop network. The network 100 may be comprised of a master node 120 and a slave node 150 containing components such as LF-bus circuits 111, multiplexers 122, modulators 112, modulator subsystems 126, couplers 108, shunts 109, and filters 104. The master node 120 includes a master LF-bus circuit 111a having a master LF input section 101. A baseband receiver/multiplexer 122a is in communication with a high-pass filter 104a via BB-bus 105, which a broadband multiplexed com bus. The high-pass filter 104a is also in communication with a broadband modulator subsystem 126a including a master broadband coupler 108a in communication with a broadband modulator 112a, which are both in communication with the BB-bus 105. As described in more detail herein, a shunt device 109 may also be provided as part of the broadband modulator subsystem 126a. It should be noted that a shunt device is not required for operation of the broadband modulator subsystem 126a. BB-bus 105 provides communication between the master node 120 and the slave node 150 and may communicate with additional slave nodes. The BB-bus 105 contains frequency spectrum channels for universe data allocation in the frequency range(s) defined for each data universe. Network frequency envelope 106 contains all the frequency spectrum channels in the BB-bus 105.

A segmentation device 104 can be formed from low-pass, high-pass and/or band-pass filter construction to allow preservation of other data universes while propagating the intended signal intelligence onto the intended data universe. These segmentation devices 104 may be constructed via active and/or passive analog circuitry and/or digital filter implementation in software/firmware/ASIC. One implementation of a high-pass filter and/or band-pass filter for coupling broadband data universe signals onto the BB bus 105 is to utilize a tuned ferrite core transformer and capacitively couple the high frequency components of the broadband transduced signal(s) on the BB bus 105 in series with the ferrite core transformer and film type safety capacitors. This technique provides voltage isolation between the broadband signals and the BB bus 105.

The slave node 150 is configured in a similar way to the master node 120 and may comprise similar components and similar pathways. For instance, the slave node 150 includes a slave LF-bus circuit 111b having a slave LF input section 101b. A baseband receiver/multiplexer 122b is in communication with a high-pass filter 104b via BB-bus 105. The high-pass filter 104b is in communication with a broadband modulator subsystem 126b including a master broadband coupler 108b in communication with a broadband modulator 112b, which are both in communication with the BB-bus 105. As described in more detail herein, a shunt device 109 may also be provided as part of the broadband modulator subsystem 126b. It should be noted that a shunt device is not required for operation of the broadband modulator subsystem 126b.

Figure 4:
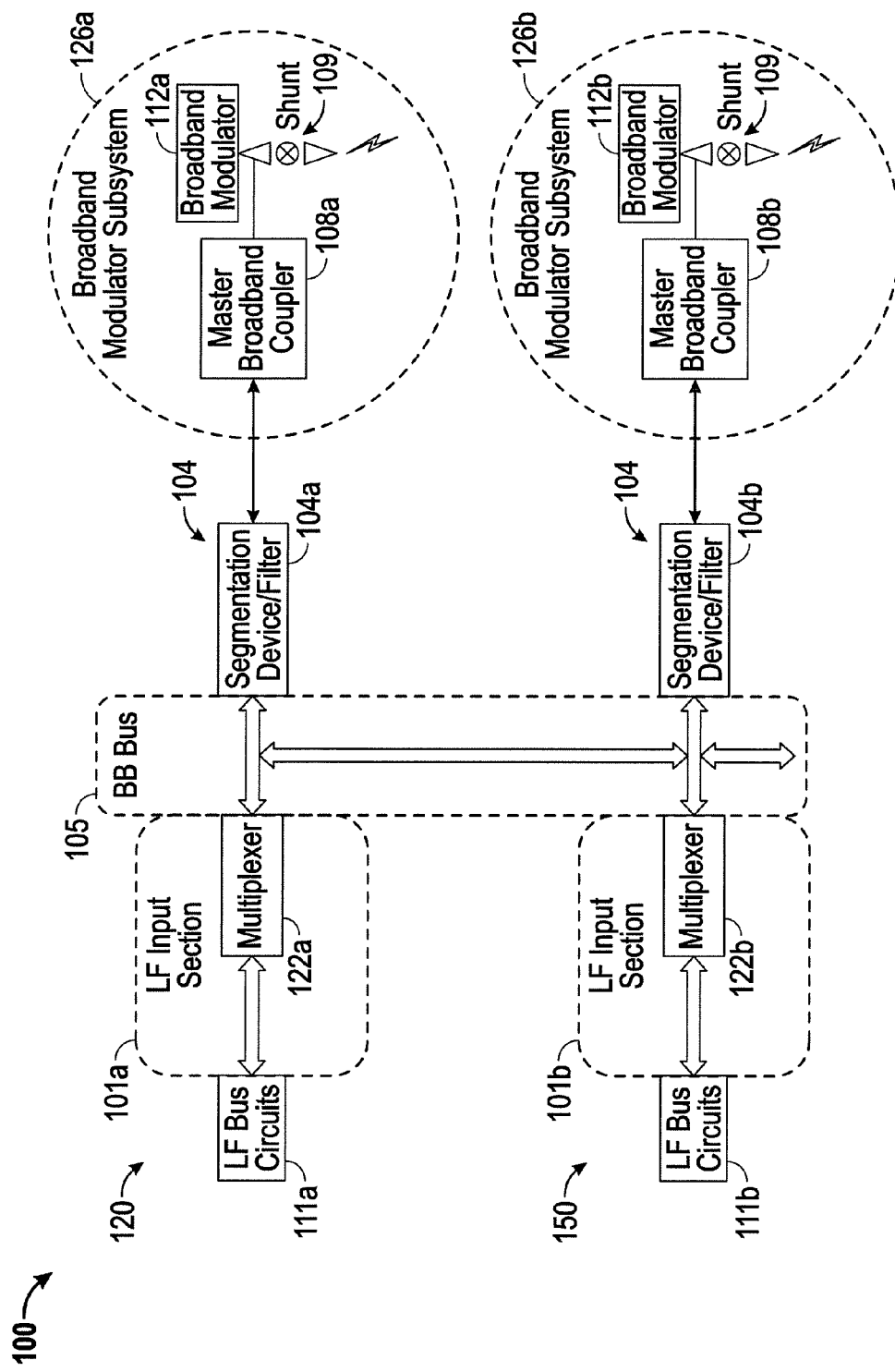
FIG. 4 is a process flow diagram of an exemplary embodiment of a communications system in accordance with the present disclosure.
Figure 5:
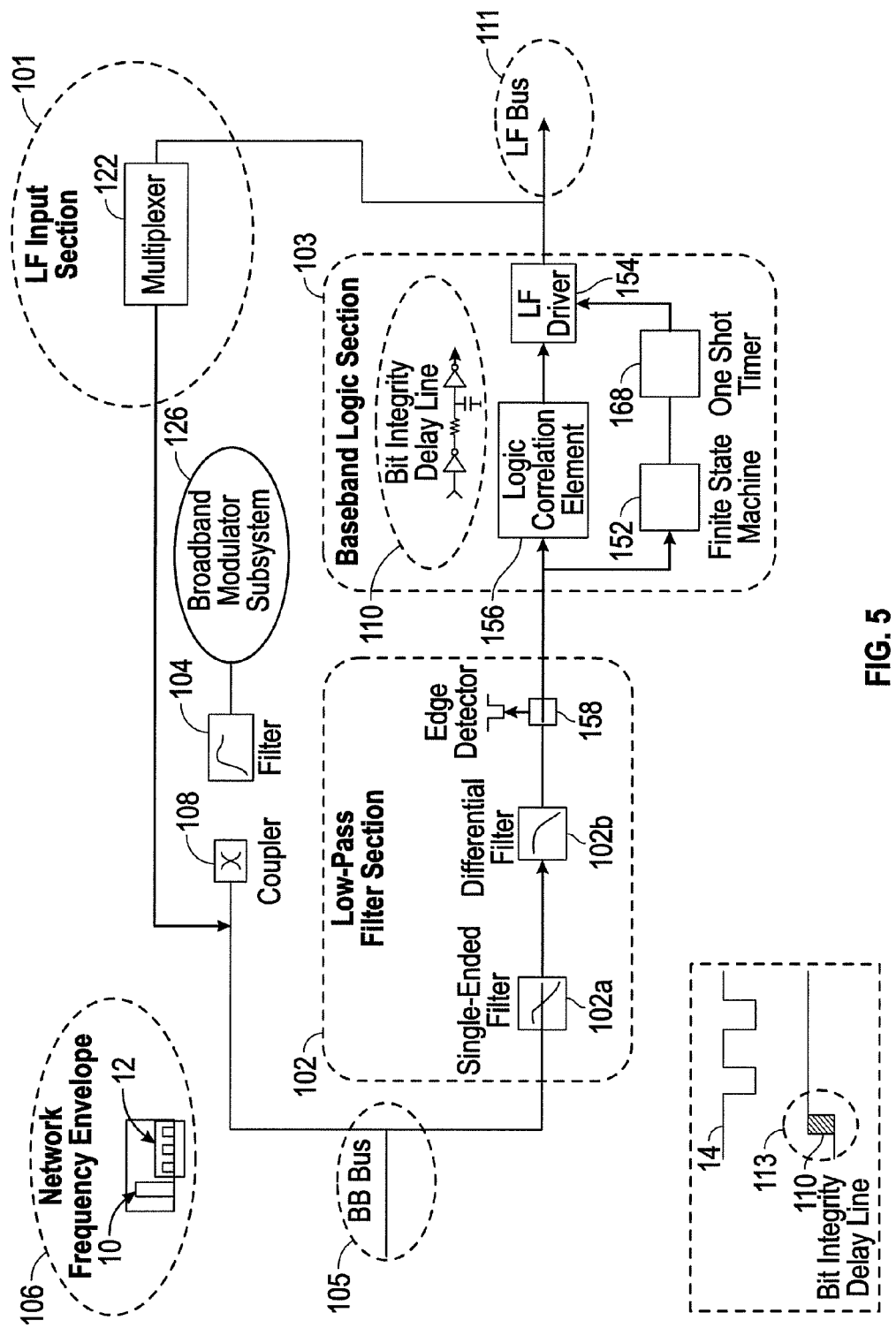
FIG. 5 is a process flow diagram of an exemplary embodiment of a communications system in accordance with the present disclosure.

In operation, exemplary data communications systems and methods have many possible modes, and can best be seen in FIGS. 4-5. In an exemplary baseband preservation mode, the baseband signal can be naturally occurring on conductive media, and the system may induce signals into other parts of the frequency spectrum onto the BB-bus 105 via a coupling device 108, in this case broadband mode 1 coupler 108b, which transmits the broadband data universe 12. In this mode the naturally occurring waveforms are intended to only reside within the baseband data universe 24 signal width area of the baseband data universe 12. Exemplary communications systems functionally induce additional waveforms via a coupling device, e.g., broadband mode 1 coupler 108b, onto the BB-bus conductive media 105 in such a way as to not disturb the signal that was independently conducted onto the media. This mode may be used for baseband waveforms such as current loop digital, analog 4-20 mA and other low impedance baseband waveforms including current carrier power systems.

Coupling techniques for the baseband can be accomplished with direct connection (often with resistive elements directly onto the BB bus) and/or utilizing inductors to couple the baseband signals to the BB bus. One advantage of utilizing inductive coupling of the baseband is the inherent filtering characteristics of the inductor to provide a low-pass filtered interface between the native conductive media and the coupled broadband universe(s). One of the indirect benefits of utilizing an inductive coupling interface for the baseband data universe is that many baseband signals (specifically power distribution systems) contain noisy high frequency components and can be highly capacitive in nature. The inductive properties between the LF bus (baseband originating signal) and the BB bus can avoid capacitive "shunting" of the broadband universes by isolating the LF bus from the BB bus by means of inductance.

In another exemplary operational mode—baseband construction mode—the baseband signal is generated directly onto the conductive media based on the monitored acquisition of the baseband on the LF-bus inputs 101a, 101b. The LF-Bus inputs 101a, 101b are connected to the existing legacy baseband signals entering the network through LF bus circuit 111a. The system additionally induces signals into other parts of the frequency spectrum via a coupling device 108, e.g., broadband mode 2 coupler 108a, 108b, which transmits the broadband data universe 12. The system functionally induces all waveforms via the coupling device onto the BB-Bus conductive media 105 and does not directly connect to the legacy system's baseband signal. This mode may be used for baseband waveforms such as RS-485, RS-232, RS-422, CAN, and other sensitive or high-impedance baseband waveforms including analog voice and audio systems.

It should be noted that when transmitting and coupling a reconstructed waveform, the implementation should avoid transmission and/or coupling of square waves onto the BB bus 105. In exemplary embodiments, digital signals may be propagated onto the conductive media in such a way as to manage the slope rise time and fall time to avoid harmonics of the digital waveform that may encroach upon unintended data universes. Use of a simple RC anti-aliasing filter can provide this feature and an advanced method could literally shape all waveforms in discrete samples that manage all energy movements in a maximum frequency sinusoidal wave shape based on Nyquist theory at discrete reconstruction rate>=highest frequency of the highest data universe in the spectrum. Exemplary embodiments would follow the digital circuitry with an analog slope management circuit that strives to move all waveforms smoothly and avoid sharp and steep edges in voltage and/or time.

Methods of coupling can be realized through capacitive, inductive or resistive methods. Direct coupling would be considered as a resistive method in the context of the present disclosure. Methods of coupling both baseband and/or broadband data universes can be realized by methods that are improvements upon the indirect coupling methods referenced in U.S. Pat. No. 5,384,023 related to indirect liquid conductivity measurement methods, which is incorporated by reference herein in its entirety.

Waveforms could also be coupled through insulating materials such as plastics (e.g., wire insulation, sheathing or tubing). These exemplary methods exploit the capacitive properties of the insulating material in between the conductive media BB bus and the coupling injection point(s). Such methods can be convenient and low-cost as part of a closed predictable system. Exemplary embodiments of a more direct capacitive coupling method can be realized by providing direct connection of the BB bus through electronic component capacitor(s) that are then connected in series to a winding of a transformer. The fundamental frequency of the transformer may be selected to allow the appropriate filtering of band-pass through the combination of capacitor(s) and transformer windings. Exemplary embodiments can also exploit the ratio of windings of the coupling transformer to yield voltage gain or attenuation between the BB bus and the transmission circuitry. This can be helpful in transmitting and/or receiving signals over greater distances by increasing signal to noise ratios. Such methods are useful in unidirectional signal transfer such as open-loop sensors or beacon alert outputs.

With reference to FIGS. 4-5 and 9-10, an exemplary method of baseband decoding for baseband construction mode will now be described. An exemplary implementation for baseband transport consists of methods of baseband decoding which monitor the native baseband signal that is input to the network via the LF-bus connector. In step 151, the LF input section 101 of the LF-bus circuit 111 monitors for a logical falling edge of input from the LF-bus receiver circuit, which is comprised of LF input section 101 and baseband logic section 103. Once a falling edge is detected 153 by edge detector 158, a finite state machine of logic 152 is invoked that begins a decoding sequence, as shown in the time delay logic flow diagram in FIG. 9 and managed by the finite state machine flow diagram in FIG. 10.

An exemplary decoding sequence starts with the BB input low-pass filter section 102, which may include a single-ended filter device 102a and/or a differential filtering device 102b (with either being an analog or digital filter), being inhibited from receiving any data for a time period determined by the baseband logic section 103. The logical input state detected on the LF input section 101 is conditioned by routing the logic state into the bit integrity delay line 110 for the purpose of providing time to allow for a pre-drive time 113 to stabilize the resulting output to the BB-bus com I/O 105 in such a way as to preserve the full pulse-width of the original input from the LF-Bus 111. More particularly, the bit integrity delay line 110 may transport and reconstruct a baseband wave shape retaining the true analog integrity of that wave shape 14. Time delay to logic correlation element 156 provides timed perspective of the data path to be driven by LF driver 154. Once the finite state machine 152 latches into this edge detection state, it will initiate transmission of the received data logic level from the LF bus circuit 111 and transmit a delayed version of the input logic state onto the BB-bus combus I/O with the assistance of the time delay provided by the bit integrity delay line 110.

The input logic levels received into the LF input section 101 may continue to be relayed as an output onto the BB-bus 105 until a retriggerable one shot timer 168 exhausts. The one-shot may retrigger on any following falling edge events detected by the baseband logic section 103. Once the baseband logic section's 103 one-shot time expires, then the post-drive 159 time is considered to be complete. The post-drive 159 time is an extra period of time determined by the baseband logic section 103 to ensure that the repeated output from LF-bus to BB-bus is relayed in its entirety without missing any bit integrity. The baseband logic section 103 discontinues driving any active signals to either BB-bus 105 or LF-bus 111 and the finite state machine is in the idle state 157.

In another exemplary embodiment, the BB input low-pass filter section 102 of the BB-Bus com I/O input circuit path, which includes BB-bus combus I/O 105, provides a filtered perspective only containing the baseband data universe's 10 signal content. The BB input low-pass filter section 102 feeds the baseband logic section 103 to allow monitoring for a logical falling edge of input from the BB-bus receiver circuit, which is comprised of BB-bus 105 and baseband logic section 103. Once a falling edge is detected 153, a finite state machine 152 of logic is invoked that begins another decoding sequence.

This exemplary decoding sequence may begin with LF input section 101 being inhibited from receiving any data for a time period determined by the baseband logic section 103. The logical input state detected on the BB input LPF filter section 102 is conditioned by routing the logic state into the bit integrity delay line 110 for the purpose of providing time to allow for a pre-drive time 113 to stabilize the resulting output to the LF-bus 111 being driven by LF driver 154 in such a way as to preserve the full pulse-width of the original input from the BB-bus 105. Once the finite state machine 152 latches into this edge detection state 153, it will initiate transmission of the received data logic level from the BB bus circuit, comprised of BB input LPF filter section 102 and BB-bus 105, and transmit a delayed version of the input logic state onto the BB-bus combus I/O 105 with the assistance of the time delay provided by the bit integrity delay line 110.

The input logic levels received into the LF input section 101 may continue to be relayed as an output onto the BB-bus until the retriggerable one shot timer 168 exhausts. As mentioned above, this one-shot may retrigger on any following falling edge events detected by the baseband logic section 103. Once the baseband logic section's 103 one-shot time expires, then the post-drive 159 time is considered to be complete. The baseband logic section 103 discontinues driving any active signals to either BB-bus 105 or LF-bus 111 and the finite state machine is in the idle state 157. It should be noted that the idle state of the finite state machine allows either bus (LF 111 or BB 105) to initiate the sequence above. Once the finite state machine events begin as shown above, the direction of baseband repeater operation is locked into that direction and mode until the finite state machine state returns to idle.

It should also be noted that methods of modulating and demodulating onto broadband data universes can be realized by methods referenced in co-owned U.S. Pat. No. 7,167,081, which is hereby incorporated by reference in its entirety. These methods as well as others including frequency shift keying (FSK), phase shift keying (PSK), orthogonal frequency divisional multiplexing (OFDM) and pulse coded modulation (PCM) wave shaping can be utilized simultaneously to generate and intercommunicate on multiple and independent broadband data universes. It is important to note that a broadband data universe does not necessarily imply that a specific data universe is intended to be a utilized as high data rate functionality. It is possible that particular broadband data universes are low data rate (or simply beacon signals) that have specific attributes of desired functionality (i.e. low latency signaling to nodes in parallel).

Exemplary embodiments of the present disclosure can provide security features as well. More particularly, baseband key assignment for broadband Ethernet security can be provided. An important aspect of disclosed embodiments for security applications is the concept of adaptive security key management over baseband while providing secure network Ethernet traffic (or other secure data and/or waveform patterns) over broadband data universes. In such embodiments, a pair of wire (or conductive media) can carry an IP-enabled traditional security enabled Ethernet transaction while a separate and independent system is rotating security key assignment (i.e. AES encryption keys assigned via baseband).

More particularly, such embodiments provide highly secure methods of communicating between two or more nodes with multiple signals that are strategically segregated from each other by means of frequency bands, modulation types, encoding types and unaltered waveform cohesion of selected bands. Exemplary methods can be implemented with baseband providing RS-485 or other carefully encoded timing waveforms while incorporating advanced Internet Protocol (IP) security algorithms (i.e. AES) on the broadband. The security keys for the IP security can be real-time managed and re-allocated based on real-time authentication and key assignment by the baseband closed-loop communication.

Figure 6:
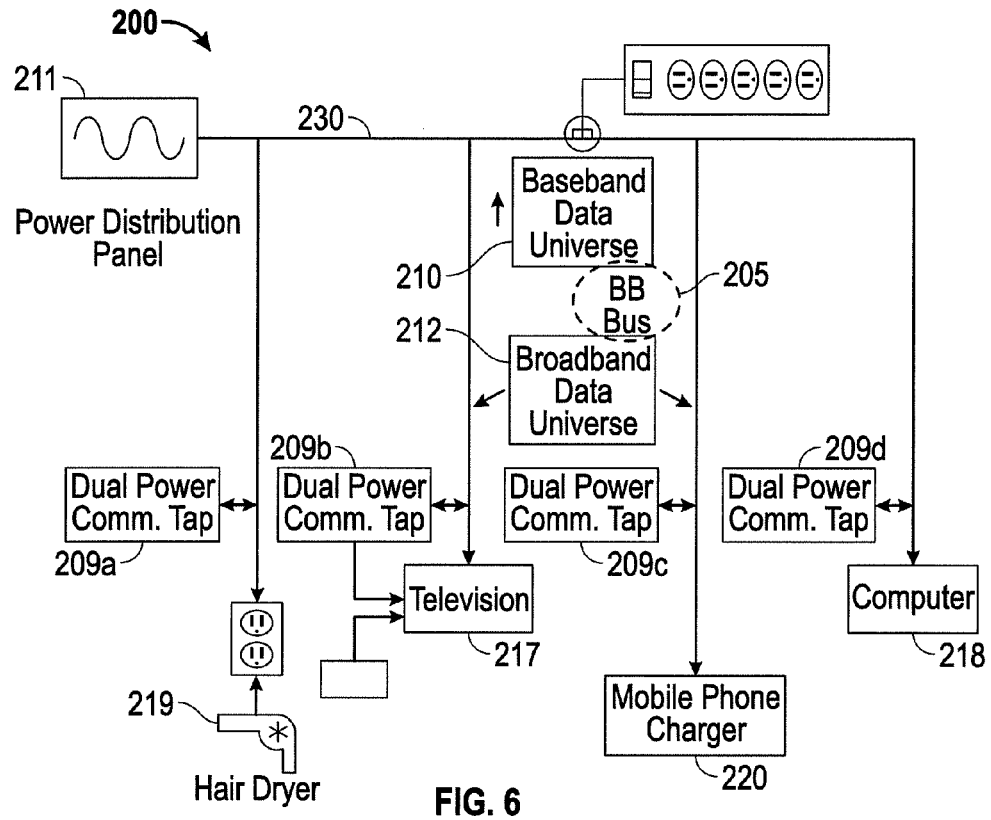
FIG. 6 is a process flow diagram of an exemplary embodiment of a power distribution and management system in accordance with the present disclosure.
Figure 7:
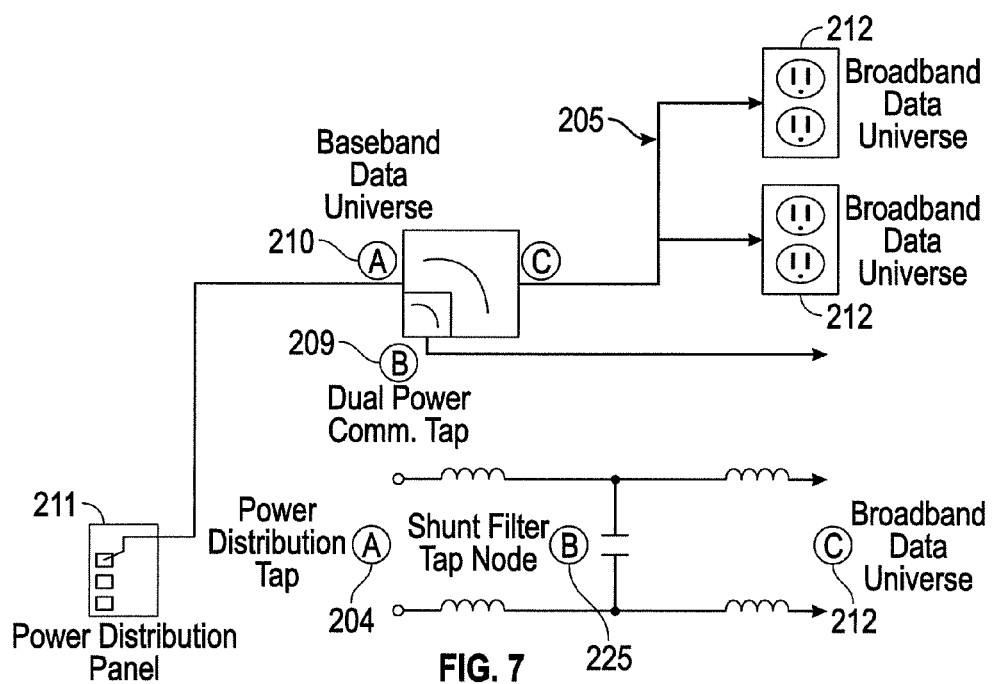
FIG. 7 is a process flow diagram of an exemplary embodiment of a power distribution and management system in accordance with the present disclosure.

Turning to FIGS. 6 and 7, exemplary embodiments of power distribution and management systems and methods will be described. As mentioned above, shunt filtering and shunt-managed filter functionality may be provided. One of the advantageous implementations of disclosed systems and methods relates to power distribution over a baseband data universe, and may also include transmission of power or energy data over one or more broadband data universes. Efficient distribution of power, management of energy usage and demand response capability has become very important in view of the growing population and the intensifying problem of global warming.

Exemplary embodiments provide innovative new ways of addressing the drawbacks of existing powerline communication or current-carrier communications systems. Power distribution and management system 200 includes a conductive media infrastructure 205, in exemplary embodiments, a BB bus. BB bus 205 is in communication with a baseband data universe 210 and at least one broadband data universe 212. In exemplary embodiments, the baseband data universe 210 distributes power 230 to various systems and devices which function on electricity. These may include wired devices such as a television 217, a mobile phone charger 220, a hair dryer 219, and a computer 218. The one or more broadband data universes 212 communicate energy data, such as individual usage data, load data, and other information to enable utilities and/or consumers to implement demand response and energy management strategies.

A power distribution tap 204, shown as point A in the electrical perspective, is in communication with the BB bus 205. The power distribution tap 204, which is an exemplary implementation of a segmentation device 104 described above, partitions the broadband data universe 212 from the baseband data universe 210, shown as point A in the system perspective. A dual power communication tap 209a-d, a specialized version of the coupling device 109 described above, is also provided. Dual power communication tap 209, shown as point B in the system perspective, delivers the baseband data universe 210 and the at least one broadband data universe 212 either uni-directionally or bi-directionally via the BB bus 205 such that the power distribution via the baseband data universe 210 is preserved while the energy data can be communicated via the broadband data universe 212.

More particularly, power distribution panel 211 provides power from a power distribution center (not shown). The power travels through the baseband data universe 210 in the form of electricity and is input to the power distribution tap 204 at input point A, shown in both system and electrical perspectives in FIG. 7. The power is shunt filtered by power distribution tap 204 at shunt filter tap node 225, shown at point B in the electrical perspective. Non-shunted communications such as energy data are modulated so they travel through the broadband data universe 212, shown as point C in the electrical perspective, via the BB bus 205 to avoid interference with the power in the baseband data universe 210. In this way, clean shunted power can be provided via the baseband and energy data can be transmitted via broadband.

Additionally, the managed infrastructure of BB-bus capable and shunted power "walls" can be scaled to allow many subnets of communication independent of each other while providing power to devices that are not typically compatible with current carrier communication. These systems and methods also allow many nodes to be connected to the communicating data universes without the problems of cumulative capacitive shunting and noise-floor increases associated with multiple power conditioners and noisy devices plugged into a common power system. Such multiple nodes could include different sub-networks, which can be managed and grouped together in a logical fashion. For instance, entertainment devices such as the television and cable box can be segregated from kitchen appliances.

Thus, exemplary power distribution embodiments advantageously provide distribution of power with local communication infrastructure by allowing non-shunted clean power along with full spectral data universe communication across the local infrastructure. The above-described power distribution systems and methods provide the capability for demand response and green energy management over the same infrastructure, and load management can be unidirectional or bidirectional. In addition, with such networks made compatible for intercommunicating data and power, the utility grid can better evolve because the health of the grid can be monitored through implementation of disclosed embodiments. In particular, disclosed power distribution systems and methods can be used to analyze grid stability as well as transformer and substation health. They also provide the ability to analyze and determine transmission impedance in communication wiring and power distribution systems.

It should be understood that exemplary systems and methods described herein can be implemented in a variety of ways. For instance, exemplary embodiments could be used to detect substances with specific chemical signatures in liquids and gases. The purpose or intended use of data universes is not limited to binary data networking. More particularly, implementations could exist that would utilize the delta signal integrity of multiple data universes to monitor and determine the chemical composition of a solid, liquid or gas. These methods could utilize a combination of data universes to evaluate the relative amplitude and retained wave shape cohesion of the sub-channels within each or selective data universes. The distortion characteristics within the overall pattern of data universes could be compared with the distribution of selected distortion patterns of data universes relative to one another. Disclosed methods approximate mass spectroscopy of the conductive media, and the relative delta readings compared to the absolute overall readings can provide meaningful data that represent the conductive media status and/or composition.

Methods of tuning and receiving baseband intelligence from a differential signal on a two wire wireline bus can be provided. In such methods, the two wire wireline bus may contain an intentionally induced differential signal located in the frequency spectrum in a range that is not in the receiving range of the tuned receiver. The tuned baseband receiver may have the ability to reject (or cancel) noise that is "common-mode" within the baseband. This feature is advantageous in that it allows singled-ended broadband rejection by tuning and additionally allows the receiver to be noise-tolerant to 50/60 Hz and motor/switch noise in a noisy electrical environment. The common-mode noise rejection of the differential receiver is intended to function primarily in the baseband and would likely exist after the tuning (or filtering) input stage.

Although mentioned above, it should be noted that another exemplary implementation involves coupling a broadband signal (or several broadband "data universes" or "bands") onto a common infrastructure of conductive media. As discussed above, the conductive media could be wire, metal, liquid or gas that provides conduction of electricity. The broadband coupling device or devices can co-exist with a baseband signal on the same conductive media infrastructure. In exemplary embodiments, this coupling device would not interfere or significantly attenuate the baseband signal or other broadband data universes.

Also possible are methods of reconstructing a received baseband signal (known as LF bus) onto a multi-band conductive media infrastructure in such a way as to propagate a combination of data universes, or bands. Such exemplary methods could receive an LF Bus band of intelligence, transport the baseband information, not interfere or alter the broadband data universes on the conductive media infrastructure or bus (referred to herein as the BB Bus 105) and receive or redistribute the LF Bus data on one or more receiving nodes known as clients.

Another exemplary implementation allows low frequency signals to be extracted (or coupled) from a BB-Bus into a receiving device in such as way as to not attenuate the broadband signals on the BB-Bus of which the baseband coupler is connected. Such methods can be implemented in devices that typically use capacitive shunting, or by connecting a capacitive filter directly onto the communication media and/or through resistive elements. These exemplary embodiments advantageously receive the baseband and not the broadband—while not attenuating or altering the broadband intelligence.

Thus, it is seen that communications systems and methods are provided. It should be understood that any of the foregoing configurations and specialized components or may be interchangeably used with any of the apparatus or systems of the preceding embodiments. Although illustrative embodiments are described hereinabove, it will be evident to one skilled in the art that various changes and modifications may be made therein without departing from the scope of the disclosure. It is intended in the appended claims to cover all such changes and modifications that fall within the true spirit and scope of the disclosure.

What is claimed is:

1. A power distribution and management system comprising:
   a conductive media infrastructure in communication with a baseband data universe distributing power over a legacy communications system and at least one broadband data universe communicating energy data;
   a power distribution tap in communication with the conductive media infrastructure, the power distribution tap partitioning the broadband data universe from the baseband data universe and adapting a set of guard bands, the guard bands including sub-channels and upper guard bands and lower guard bands, each upper guard band defining an upper limit of a data universe and each lower guard band defining a lower limit of a data universe, each guard band having a width being present at the upper limit and lower limit of each data universe, the power distribution tap managing varying guard band widths, managing varying band positions of the guard bands, and managing non-uniform frequency bandwidth distribution throughout the frequency spectrum of the conductive media infrastructure and facilitating combining of multiple waveforms such that multiple information types can reside within a broadband or baseband data universe;
   a dual power communication tap delivering the baseband data universe and the at least one broadband data universe bi-directionally via the conductive media infrastructure such that the power distribution via the baseband data universe is preserved while one or more devices communicate the energy data via the broadband data universe, the dual power communication tap utilizing inductive coupling to functionally induce waveforms onto the conductive media without direct connection to the legacy communications system;
   wherein the energy data can be used to deliver information relating to the power distributed through the baseband data universe.

2. The system of claim 1 wherein the transmission parameters comprise one or more of: wave shapes and wave frequencies.

3. The system of claim 1 wherein the baseband data universe resides within a differential communications system used to communicate serial data on an existing unified communication system.

4. The system of claim 1 wherein the broadband data universe contains encoded information structured as digital network data packets.

5. The system of claim 1 wherein the baseband data universe resides on conductive media comprising at least one twisted pair of wire.

6. The system of claim 1 further comprising a plurality of broadband data universes.

7. The system of claim 1 wherein the first signal is independently occurring in the baseband data universe.

8. The system of claim 1 wherein the first signal is generated directly onto the baseband data universe.

9. The system of claim 8 further comprising an LF-Bus in communication with the at least one first signal of the baseband data universe.

10. The system of claim 1 wherein the conductive media infrastructure comprises a differential communication wireline bus and further comprising a filtering device in communication with the differential communication wireline bus.

11. The system of claim 10 wherein the filtering device cancels common mode noise in the baseband data universe.

* * * * *